Feb. 14, 1956 E. B. ROBINSON ET AL 2,734,432
MACHINE FOR THE PRODUCTION OF HELICALLY WOUND TUBES
Filed Dec. 29, 1952 5 Sheets-Sheet 5
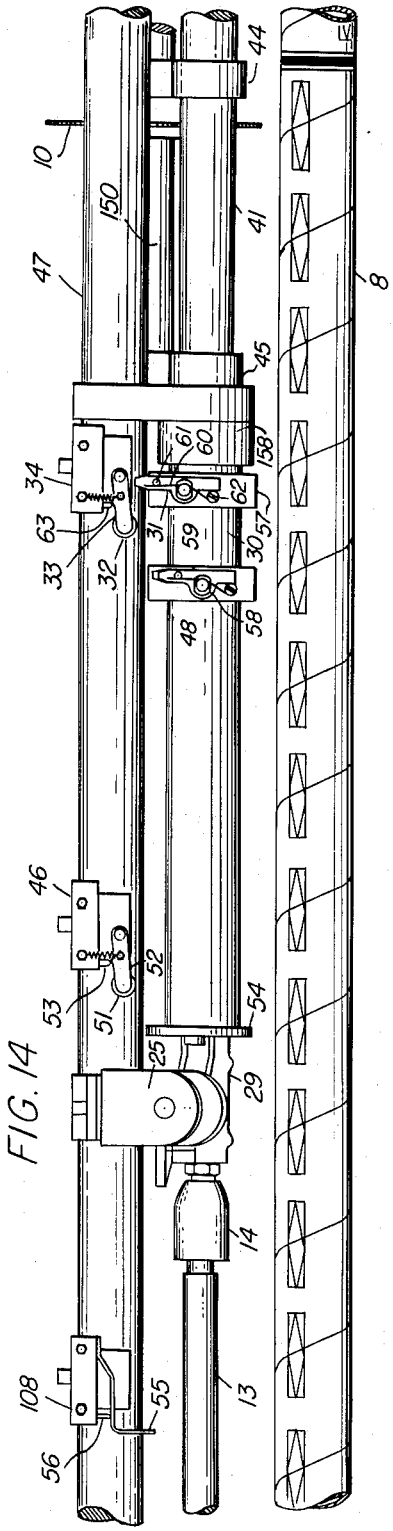
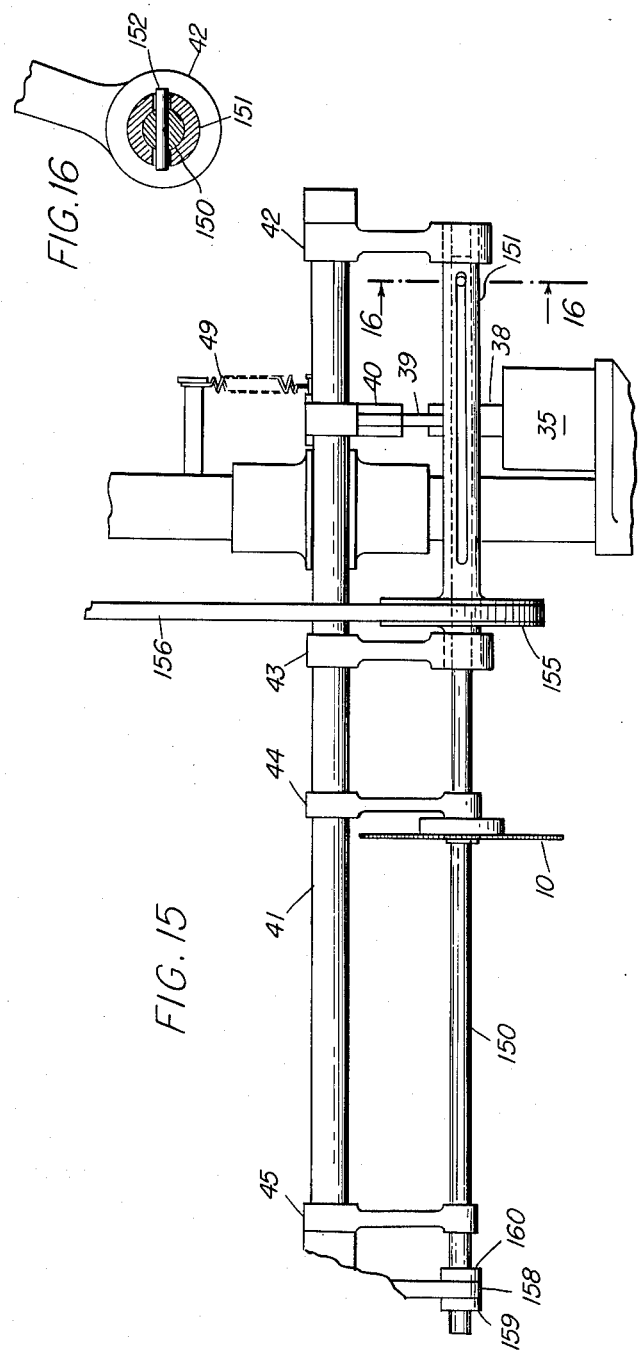
Inventors
Ernest Bradbury Robinson
Francis Goff Glasby
By their attorneys
Howson and Howson United States Patent Office 2,734,432
Patented Feb. 14, 1956

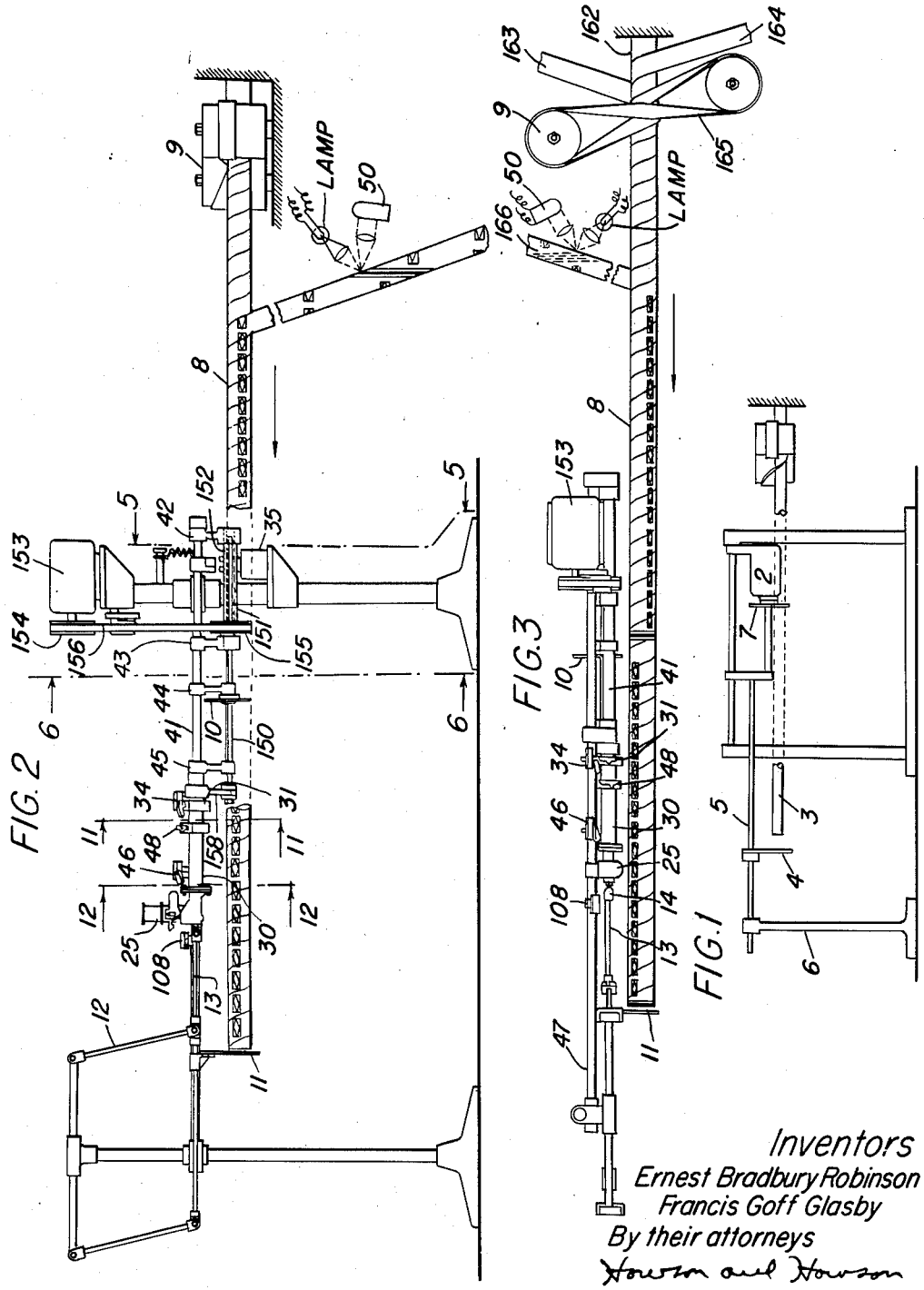

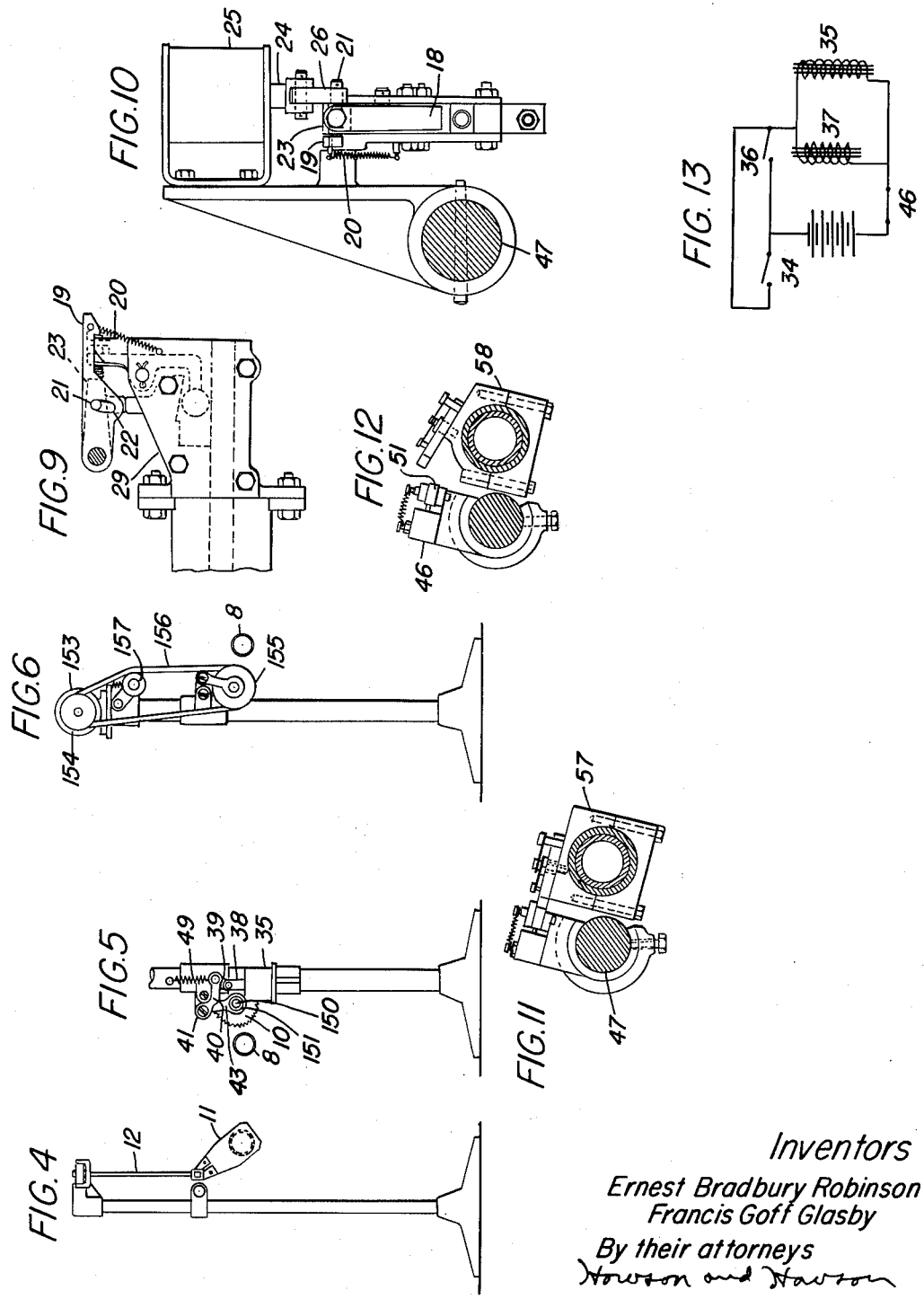

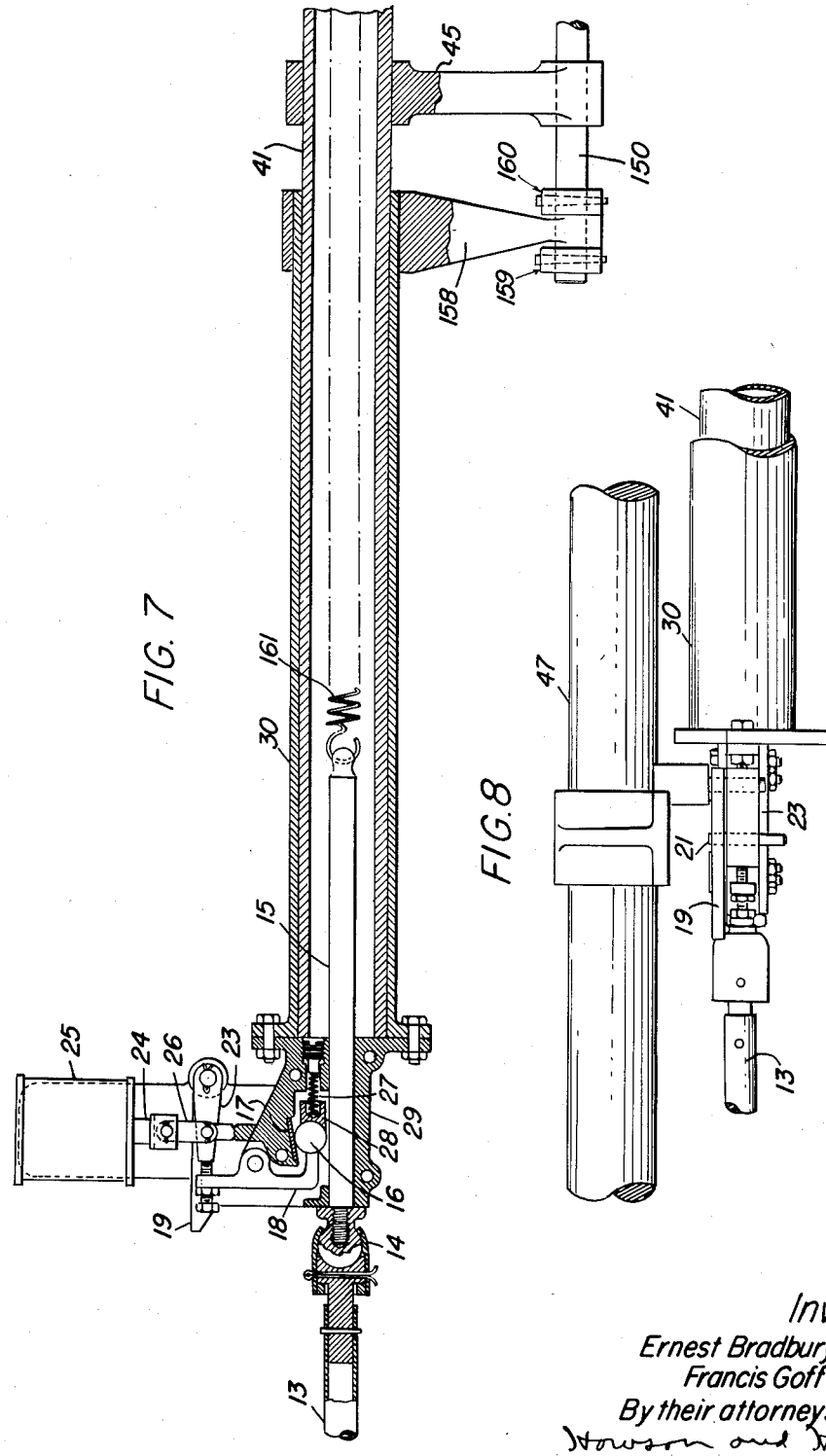

2,734,432

MACHINE FOR THE PRODUCTION OF HELICALLY WOUND TUBES

Ernest Bradbury Robinson, Ashgate, Chesterfield, and Francis Goff Glasby, Chesterfield, England; said Glasby assignor to said Robinson Application December 29, 1952, Serial No. 328,304

8 Claims. (Cl. 93—80)

This invention relates to machines for the production of helically wound tubing and more particularly to means therein for cutting the continuous length of tubing into separate lengths.

In copending U. S. patent applications Ser. No. 726,467, filed February 5, 1947 (now Patent No. 2,623,445), and Ser. No. 11,955, filed February 28, 1948 (now Patent No. 2,623,443), E. B. Robinson has disclosed a method of producing a container with a spirally wound unitary pattern on it which will always be in registry with the container, and machines for carrying out that method.

In copending U. S. patent applications Ser. No. 290,697, filed May 29, 1952 (now Patent No. 2,712,778, dated July 12, 1955), and Ser. No. 290,698, filed May 29, 1952 (now Patent No. 2,699,099, dated January 11, 1955), E. B. Robinson has also disclosed machines for carrying out his method of producing a container with a spirally wound unitary pattern on it which will always be in registry with the container.

The object of the present invention is to provide an alternative form of machine for carrying out said method.

It is characteristic of our invention that there is provided in conjunction with cutting means, means associated with the moving tubing releasably connected to the cutter mechanism under control of control means.

In one embodiment pick up means are provided preferably comprising a target or feeler disposed in the path of the being formed tube so that when the tube end makes contact with the same it is carried forward. In known machines of this kind the moving target or feeler by means of direct linkage carries the cutter carriage with it. According to the present invention, however, releasable connecting means are provided associated with the pick up means and the cutter carriage in such manner as not to allow the movement of the cutter carriage to become effective until the detector signifies that the pattern is properly positioned for cutting in register.

It will be appreciated therefore that whereas said known machines can only cut to length, in our invention, delaying the connection of the cutter carriage with the pick up means, enables cutting to take place to pattern and not to length.

The scope of the invention is not restricted solely to machines where the cutter or cutters are carried by pick up means connected to the moving tubing, as in the example shown and described hereinafter, but will include embodiments where the traverse of the cutting means is accomplished by power-assisted means or servo mechanisms used in conjunction with pick-up means, connected to the moving tubing.

In every case, however, there is a device introduced somewhere between the means employed for picking up the motion of the being formed tube and the cutting means. Basically, it will be seen that this interposed device is so constructed that the pick up means is normally moveable by the tubing independently of the cutter device but is coupled to the cutter at appropriate times by a coupling means operating under the influence of a detector. As described in the above mentioned patents this detector is actuated by control features on the moving tubing or strip.

Our invention can very conveniently be installed on the type of tube winding machine on the market in which the cutter carriage is directly linked to and brought into operation by a target flap placed in the path of a being formed tube.

In order that the nature of the invention may be more readily understood reference will now be made by way of example to the accompanying drawings in which:

Figure 1 is a diagrammatic view in elevation of a well known type of cutting machine which has not been adapted for cutting in register according to our invention, but would form a suitable basis for same.

Figure 2 is a schematic view in elevation of the most essential parts of a single cut winder embodiment of our invention.

Figure 3 is a schematic view in plan of the most essential parts of a single cut winder embodiment of our invention.

Figure 4 is a view in end elevation of certain parts shown in Figure 2.

Figure 5 is a sectional view at 5—5 in Figure 2.

Figure 6 is a sectional view at 6—6 in Figure 2.

Figure 7 is a part sectional elevation showing the principal modifications needed to adapt a conventional cutting machine to perform within the scope of this invention.

Figure 8 is a schematic plan of certain parts shown in Figure 7.

Figure 9 is an elevation in reverse of part of Figure 7.

Figure 10 is an end elevation of certain parts appearing in Figure 7.

Figure 11 shows in elevation details of electrical switch means for use with circuit responsible for lateral movement of cutter.

Figure 12 shows further details in elevation of electrical switch means for use with circuit responsible for lateral movement of cutter.

Figure 13 is a circuit diagram for use with means causing lateral movement of cutter.

Figure 14 is a plan view of part of the machine showing how the switches and associated parts of the preceding figures cooperate.

Figure 15 is a view in elevation of means driving the saw.

Figure 16 is a view in section through the quill shaft of Fig. 15, taken on the line 16—16 of that figure.

Figure 10A:
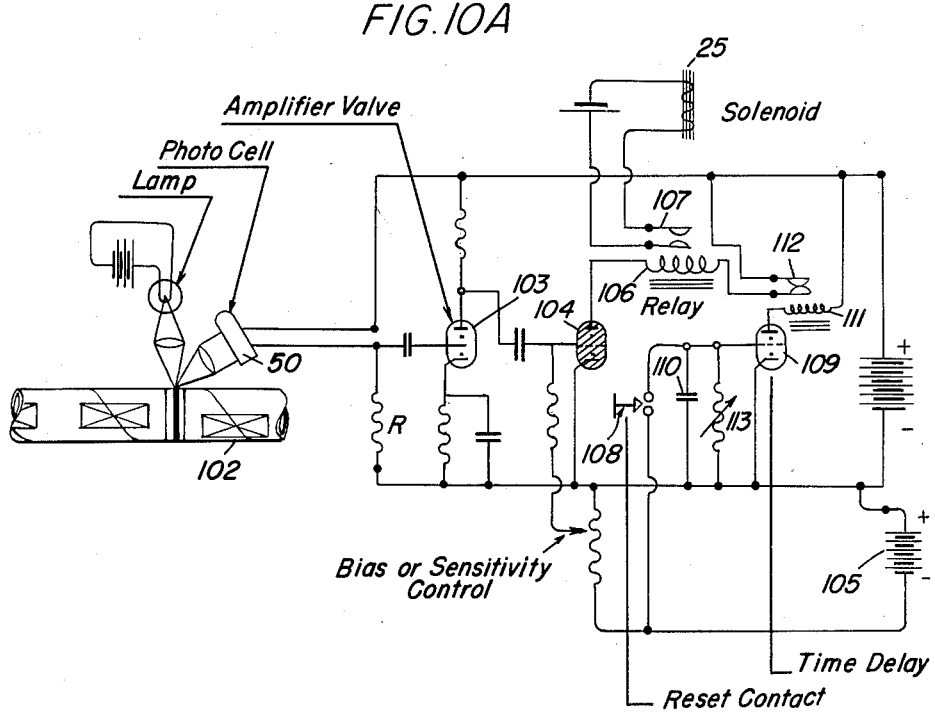
Figure 10a shows circuit of control means.

In the machines shown and described in the prior patents above referred to, there are provided a mandrel, means for winding strip material helically thereon in such manner that a continuous length of tubing is produced moving in a direction axially of the mandrel, a cutting device for cutting the tubing into separate lengths as it is produced, means for moving the cutter device transversely of the tubing to effect the cuts, means for traversing the cutter device axially of the tubing and in the same direction as the tubing is moving during the cutting operation, and control means for ensuring that the cuts are made in the tubing at predetermined locations therein.

Referring now to the schematic showing of Fig. 3, it will be sufficient to explain that the tubing 8 is formed on a stationary mandrel 162 by the spiral application thereto of two strips 163 and 164 of paper, thin cardboard or other suitable material (or if desired, only one strip which overlaps itself when wound). These strips 163 and 164 are drawn on to the mandrel 162 from sources of supply (not shown), and the being-formed tubing is rotated on said mandrel and is screwed along it by means of an endless belt 165. The strip 166 is a patterned strip (the pattern being applied before or during formation of tubing), and is preferably wrapped with the margins of its convolutions overlapping each other, although if desired the edges of the convolutions may abut each other. The strip 163 also overlaps the strip 164 which is preferably wrapped with the edges of its convolutions abutting each other, although if desired its margins may overlap each other.

As the tubing is being produced its leading end travels past a cutting saw 10 (Fig. 2). As shown in Figs. 2 and 3, the cutter device is traversed by the moving tubing through the intermediary of a flap or the like engaged by the end of the tubing and arranged to be connected to the cutter device. It will be appreciated that in this arrangement the flap constitutes the said control means for ensuring that the tubing and cutter device traverse in synchronism. For ensuring that the cuts are made at predetermined locations the said flap is normally movable independently of said cutter device but is coupled thereto at predetermined times by releasable connecting means actuated by control means such as those above referred to in connection with the said earlier patents. The tubing is cut at locations determined by said control features, and may be made to take place in any desired relationship to the patterned tube by suitable adjustment of the initial position of the detector. The releasable connecting means may be of any convenient nature, such for example as a rod and friction pads carried by the cutter device, or other mechanical, hydraulic, electric or pneumatic means, or any combination thereof. Any suitable means, such for example as spring means, may be employed for returning the flap and the cutter device to their initial starting positions after each operation, and adjustable stop means may be provided for determining their starting positions. Any suitable means, such for example as a pneumatic ram, may be employed for moving the cutter or cutters across the tubing to cut it. The cutter or cutters may be rotated by any suitable means, such for example as an electric motor or by belt and pulleys.

Specifically in Figure 1 in which a well known type of cutting machine is shown we see that the saw mechanism 2 is drawn along by the pressure of the end of the being formed tube 3 on a target 4, the target being connected to the saw mechanism by a rod 5 which is free to slide at one end in a support 6. It will be seen that the tube can be considered as a motive power means for traversing the cutter mechanism. Various methods for producing motion of the cutter laterally across the tube to produce the cut during the travel of the carriage, are used, but these do not come within the scope of our invention. The length of tube cut off at each cutting stroke will be equal to the distance between the target 4 and the saw wheel 7. When the tube has been completely severed circumferentially it is either removed or falls away under its own weight, the cutter carriage is then returned to its rearward position with the saw in a retracted state by various means such as tension spring, cam drive, hydraulic, pneumatic, or any other suitable means. The cutting mechanism 2 remains at rest until the tube end again makes contact with the target 4 when a new cutting cycle is commenced.

In the example shown in Fig. 7 a tension spring 161 is used to return the saw 10 to its rearward position, one end of the spring 161 being attached to a rectangular bar 15 and the other end to the fixed frame of the machine at the opposite end of tubular shaft 41.

The various types of machine of which Figure 1 is representative have one feature in common in that in all types, the cutting means receives its motion from the material being cut whether directly as shown in Figure 1 or by power assisted means or servo mechanisms.

Figures 2–16 show a cutting machine representative of one such type of machine modified according to our invention. Referring to Figures 2 and 3 a pattern bearing tube 8 produced by spiral winding mechanism 9 travels past a rotating saw 10, which is representative of one or more cutters which may be employed. In the path of the tube 8 is a target 11 mounted in well known manner on a parallelogrammic linkage 12. When the tube end makes contact with the target 11, the target is pushed along by the tube causing a further link 13 which has ball-joints 14 at each end, and a rectangular bar 15 to be pulled along at substantially the same rate of travel as the tube 8. At this stage the cutter mechanism remains unaffected by the motion of the target 11 due to the roller 16 being held out of engagement with the rectangular bar 15 and the wedge surface 17, by a lever 18. The cutter mechanism is retained in its rearward position as shown in Figures 2 and 3, by a latch 19 which is lightly biased downwards by a spring 20. A peg 21 engaging in a slotted hole 22 in the latch 19 serves to maintain a stop lever 23 in its lowermost position at all times when the latch 19 is at its lowermost position. When a suitable control feature operates the control means, a solenoid 25 is energised causing its armature 24 to be lifted. The armature 24 is connected to the stop lever 23 by a link 26. The action of raising the stop lever 23 also lifts the latch 19 due to the engagement of the peg 21 in the slot 22 of the latch. As soon as the stop lever 23 is raised, a spring 27 causes a slipper 28 to urge the roller 16 into engagement with the rectangular bar 15 and the wedge surface 17. The wedging action of the roller causes the roller housing 29, and hence the tube 30 and the saw together with its immediate attachments, to be drawn along by the target 11 engaging on the forward end of the tube 8.

While the saw 10 is being drawn along by the target 11 engaging on the forward end of tube 8, means which will be described later in detail, operate to swing the saw 10 into cutting engagement with the tube 8 for a sufficient time to ensure complete severance, and then retract the saw 10 to a non-cutting position. The cut tube may be removed or will fall away and the saw 10 will cease to be drawn along by the target 11 and tube 8. Just before the end of the cutting stroke flange 54 on tube 30 engages with the operating leaf spring 55 of a switch 108 depressing plunger 56 and momentarily closes the associated contacts 108 and thus deenergizes solenoid 25 and initiates the process of resetting the control means in a manner to be described later. Deenergizing solenoid 25 allows armature 24, Fig. 7, latch 19, link 26 and stop lever 23 to drop to their normal position. When the forward movement of the saw has ceased, and the saw has been retracted, spring 161 returns the saw 10 and its attachments to their rearward positions and causes rectangular bar to retract into roller housing 29. When the rearward position has been reached, latch 19 is engaged and retains the cutter mechanism in its rearward position.

The saw 10 is mounted on a shaft 150. At one end the shaft 150 passes inside a quill shaft 151 and a peg 152 set diametrically across the shaft 150 engages in a longitudinal slot in the quill shaft 151, so that the shaft is free to slide within the quill shaft but not to rotate relative thereto. An electric motor 143 drives the quill shaft 151 by means of pulleys 154 and 155 and a belt 156. An ordinary belt tensioning device of the spring type is shown at 157. The electric motor 153 thus serves to impart rotation to the saw 10. Longitudinal movement of the saw 10 is imparted by the target 11 at appropriate times through the link 13, roller 16, rectangular bar 15, wedge surface 17, tube 30 and arm 158 attached to the tube 30, one end of said arm being located between the bosses 159 and 160 attached to the shaft 150.

The saw 10 is normally in a retracted position as shown in Figure 5. It is necessary however, for the saw to be brought into engagement with the tube 8 in order to sever same and then retracted after severance is completed. For this purpose use is made of two identical one-way trip assemblies 57 and 58 mounted on tube 30. Referring to assembly 57, a one-way trip lever 31 is mounted on a pivot 59. A looped wire torsion spring 60 having two arms is fitted so that its loops fits on pivot 59 and one arm is retained by a notched peg 61 which is attached to one-way lever 31. The other arm of spring 60 is retained by notched stop pin 62 which is attached to the base of assembly 57. The spring is loaded so that a light force is produced which maintains the one-way trip lever 31 normally in light pressure engagement with stop pin 62. The assembly 57 is mounted so that when it travels forward with the tube 3 after commencement of the cutting stroke the one-way trip lever 31 will firmly engage the roller 32 causing lever 33 to be depressed, which in turn depresses plunger 63 causing the points of switch 34 which is mounted on rod 47 to be closed until the one-way trip lever 31 has passed by when they will reopen. When during the return stroke the one-way trip lever 31 engages the roller 32 the one-way trip lever 31 moves in an angular fashion about the pivot 59 in anti-clockwise manner according to the view point of the Figure 12 against the light resistance of spring 60 and thus being able to move angularly, the one-way trip lever 31 does not depress the roller 32 and is able to slide past roller 32 hence the points of switch 34 remain open.

As mentioned in the foregoing paragraph a second one-way trip assembly 58 is provided identical in construction with assembly 57 described therein. This assembly is also mounted on the tube 30 in such manner that one-way trip lever 48 firmly engages with roller 51 when severance of the tube 8 is almost completed, causing lever 52 to be depressed and plunger 53 to be depressed causing the points of switch 46 to be opened until such time as the one-way trip lever 48 has passed by. During the return stroke the one-way trip lever 48 will not affect the points of switch 46 which will remain closed, due to the one-way trip lever 48 moving angularly about its pivot in the manner described for one-way trip assembly, or swinging out of operative alignment as will be described later.

Having described the construction and operating details of the one-way switch assemblies 57 and 58, the manner in which they cooperate in the carrying out of the invention will now be described. Reference should be made to Fig. 12 and Fig. 13. When the cutting stroke commences as dictated by a suitable control feature in the manner already described, the one-way trip assembly 57 moving with the tube 30 causes the points of switch 34 to be closed momentarily while the one-way trip assembly 57 passes by the switch 34, in the manner already described. This momentary closing of the points of switch 34 brings into operation an electrical circuit (Fig. 13) of the "self-holding" type by energizing an electro magnetic relay 37 thus closing contacts 36, which are normally open, and energizing solenoid 35. The solenoid will remain energized due to the "self-holding" nature of the circuit until a resetting operation is performed as will be described later. Energizing solenoid 35 has the effect of causing its armature 38 (Fig. 5) to move downwards. By means of the link 39 the lever 40 pinned to the tubular shaft 41, the brackets 42, 43, 44 and 45 thereupon swings the saw about a fulcrum corresponding to the centre of tubular shaft 41 into contact with the tube 8 to cut same and swing the one-way trip lever 48 into operative alignment with switch 46. As the cutting stroke proceeds and severance is almost completed, the one-way trip assembly 58 moving with the tube 30 causes the points of switch 46 to be opened momentarily while the one-way trip assembly 58 passes by the switch 46, in the manner already described. This momentary opening of the points of switch 46 causes the electromagnetic relay of Fig. 13 to be de-energized and the contacts 36 to open so that the circuit is no longer in a self-holding state and solenoid 35 will be de-energized. As soon as solenoid 35 is de-energized spring 49 (see Fig. 5) causes the armature 38 to be withdrawn upwards and lever 40 swings the saw 10 out of contact with the tube 8 by which time severance of tube 8 will be completed.

Fig. 12 shows the one-way trip assembly 58 set at a different angle to one-way trip assembly 57 in Fig. 11. This is to cater for the swing of the saw which takes place after one-way trip assembly 57 has operated during the forward stroke. When the saw has swung into cutting engagement with the tube 8, the one-way trip assembly mounted on tube 30 will swing in a like manner and assume a position where it is capable of operating on the roller 51 towards the end of the cutting stroke and thus operate upon the switch 46.

Should the saw 10 have been fully retracted speedily from the cutting position at the end of the cutting stroke, the one-way trip assembly 58 may not always engage roller 51 during the return stroke, having been swung out of operative alignment. However, the provision for anti-clockwise movement of the one-way trip lever 48 will safeguard the roller 51, lever 52, plunger 53 and switch 46 from possible damage in the event of slow retraction of the saw 10.

In practice it will be found preferable to position the target 11 at a distance from the saw 10 slightly less than the nominal length of pattern bearing tube which it is proposed to cut off at each cutting cycle.

The control means as now described are one of the types disclosed in Patent No. 2,712,778, above mentioned. Referring to Figure 10a the photo electric cell 50 is connected to a valve amplifier 103 which amplifies impulses from the cell and in turn impresses them on the grid of a gas relay valve 104 which is normally biased to an inert non-conducting state from a source of negative potential 105. The valve 104 carries a high speed magnetic relay 106 in its anode circuit with contacts 107 connected to energise the electro-magnet or solenoid 25 which disengages the latch 19 which retains the cutting mechanism in its rearward position and raises the stop lever 23 to set the cutting mechanism in motion when the cell 50 sends an impulse to the valve 104 by virtue of a control feature on the tube arriving at the position of the cell 50. The photoelectric cell can be used in connection with the tube as shown in Fig. 10a or the strip as shown in Figs. 2 and 3. (See Fig. 18 of Patent 2,712,778 or Figs. 1, 4 and 14 of that patent.)

The gas filled relay valve possesses the features of being triggered or fired from a small transient impulse of short duration with an almost inertialess response time, and of remaining in the conducting state until reset by opening the anode circuit or making the anode negative with respect to the cathode potential.

This feature allows the solenoid circuit to be established for sufficient time to allow it to do its work even though the initiating impulse may be of only microsecond duration.

Whilst opening of the anode circuit to reset the relay can conveniently be carried out by contacts associated with the travel of the cutter or the tube, it has been found more convenient to employ such contacts 108 to operate in the circuit of a further valve 109 where they initiate the charge (or discharge) of a condenser 110 which in turn governs the period that a further electro-mechanical relay 111 opens its contacts 112 contained in the anode circuit of a gas filled relay valve 104.

By suitable variation of either the charging voltage, the condenser capacity 110 or the discharge resistance 113, or all three, the time elapsing before the circuit is re-set can be varied at will and the equipment made to respond to every control feature, alternate control feature, or every third control feature etc., according to requirements. In addition the control gear can be made inert until just before the control feature arrives and consequent involuntary operation due to extraneous marks or blemishes on the paper is avoided.

In an alternative machine the single cutter as hereinbefore described is replaced by a battery of cutters (as illustrated in Patent No. 2,699,099 above mentioned, and it will be appreciated that the principles hereinbefore described can equally be applied to a gang cutting machine.

What we claim is:

1. A machine for the production of helically wound tubes, comprising a mandrel, means for winding helically on the mandrel strip material having control features thereon, and for simultaneously moving the tubing axially, cutting mechanism for severing lengths from the tubing, motive power means constituted by the moving tubing and a carrier adapted to be moved thereby for traversing the cutter mechanism with the moving tubing in the severing operation, in combination with a releasable slip connection between the carrier and cutter mechanism for initially obtaining a slip between the carrier and the cutter mechanism axially of the tubing and subsequently connecting the carrier and the cutter mechanism for the severing operation, and control means for the slip connection for determining the time of connecting same by reference to the control features on the strip material.

2. A machine for the production of helically wound tubes comprising a mandrel, means for winding helically on the mandrel strip material having control features thereon, and for simultaneously moving the tubing axially, cutting mechanism for severing lengths from the tubing, motive power means constituted by the moving tubing and a carrier adapted to be moved thereby for traversing the cutter mechanism and a feeler on the carrier and disposed in the path of the moving tubing for said purpose; in combination with a releasable slip connection between, and for connecting and disconnecting, the cutter mechanism and the carrier, and control means for operating the slip connection to cause operation of the cutter mechanism at times dictated by the control features.

3. A machine for the production of helically wound tubes comprising a mandrel, means for winding helically on the mandrel strip material having spaced control features thereon, and for simultaneously moving the tubing axially, cutting mechanism for severing the tubing into lengths as it is produced, and a feeler located in the path of the tubing and mounted so as to be movable by the tubing independently of the cutting mechanism, in combination with coupling means between the feeler and cutting mechanism for releasably coupling the feeler to the cutting mechanism at times under the control of the spaced control features on the tubing so that the cutting mechanism is thereafter carried by the tubing in synchronism therewith, means for moving the cutting mechanism laterally of the tubing to cut it at a constant time after the cutting mechanism starts to traverse so that the tubing is cut at locations governed by the control features on the tubing, means for withdrawing the cutting mechanism after the cut has been made, and means for returning the feeler and cutting mechanism to their initial positions.

4. A machine for the production of helically wound tubes according to claim 3 in which the feeler is mounted on a rod and the coupling means include gripping elements associated with the cutting mechanism actuated by the control features.

5. A machine for the production of helically wound tubes according to claim 4 in which the gripping elements comprise a roller serving as a wedging element and a bevelled surface adapted to afford mechanical coupling between the cutting mechanism and the rod, said roller being spring-pressed into wedging position, and there being movable elements electrically controlled from the control feature mechanism adapted to releasably restrain the roller from wedging position.

6. A machine for the production of helically wound tubes according to claim 4 wherein the coupling means consist of an hydraulic cylinder carried by the cutting mechanism, a piston head in said cylinder carried by the rod with fluid on both sides of the head, and a control valve for permitting or preventing flow of fluid from one side of the piston head to the other.

7. A machine for the production of helically wound tubes from strip material having unitary patterns, control features and surplus trim material, comprising a mandrel, means for winding the strip material helically on the mandrel in the form of tubing which moves axially of the mandrel and cutting mechanism for severing lengths from the tubing in combination with motive power means for traversing the cutter mechanism with the tubing in the severing operation, a releasable slip connection between, and for connecting and disconnecting, the cutter mechanism and the motive power means, and control means for operating the slip connection to cause operation of the cutter mechanism in such relation with the unitary patterns and the trim as dictated by the control features that tube lengths are severed from the tubing each having unitary patterns thereon substantially undamaged.

8. A machine for the production of helically wound tubes, comprising a mandrel, means for winding helically on the mandrel strip material having control features thereon and simultaneously moving the tubing axially, cutter mechanism for severing lengths from the tubing, and motive power means for traversing the cutter mechanism with the tubing in the severing operation, in combination with a releasable slip connection between the cutter mechanism and the motive power means comprising a part movable with the tubing independently of the cutter mechanism which is initially stationary, a part of the cutter mechanism, and a releasable connecting device for the parts which is in such independently operable relationship with respect to said parts throughout the travel of the first-mentioned part as to be operable to connect them at random throughout said travel of the first part for subsequent traverse of the cutter mechanism by the motive power means, and control means for causing operation of the device in connecting manner to be at times dictated by said control features.

References Cited in the file of this patent

UNITED STATES PATENTS

| 1,491,140 | Holt | Apr. 22, 1924 |
| 1,549,429 | Bartlett | Aug. 11, 1925 |
| 2,091,771 | Smithwick | Aug. 31, 1937 |
| 2,199,708 | Maxfield | May 7, 1940 |